US008629867B2

(12) United States Patent
Hickey et al.

(10) Patent No.: US 8,629,867 B2
(45) Date of Patent: Jan. 14, 2014

(54) PERFORMING VECTOR MULTIPLICATION

(75) Inventors: Mark J. Hickey, Rochester, MN (US); Adam J. Muff, Rochester, MN (US); Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 12/794,207

(22) Filed: Jun. 4, 2010

(65) Prior Publication Data

US 2011/0298788 A1 Dec. 8, 2011

(51) Int. Cl.
*G06T 15/00* (2011.01)
(52) U.S. Cl.
USPC .................. 345/419; 345/516; 708/531
(58) Field of Classification Search
USPC .......... 345/561, 419; 708/531, 496, 542, 277, 708/272, 276
See application file for complete search history.

(56) References Cited

U.S. PATENT DOCUMENTS

| | | | |
|---|---|---|---|
| 4,914,653 A | 4/1990 | Bishop et al. | |
| 5,031,117 A | 7/1991 | Minor et al. | |
| 5,212,789 A | 5/1993 | Rago | |
| 5,537,601 A | 7/1996 | Kimura et al. | |
| 6,021,511 A | 2/2000 | Nakano | |
| 6,088,035 A | 7/2000 | Sudarsky et al. | |
| 6,441,817 B1 | 8/2002 | Gossweiler, III et al. | |
| 6,912,716 B1 | 6/2005 | Johanson et al. | |
| 6,933,946 B1 | 8/2005 | Silva et al. | |
| 7,117,502 B1 | 10/2006 | Harris | |
| 7,385,607 B2 | 6/2008 | Bastos et al. | |
| 7,477,999 B2 | 1/2009 | Wegener | |
| 7,796,835 B2 | 9/2010 | Matsumoto | |
| 7,808,500 B2 | 10/2010 | Shearer | |
| 7,830,379 B2 | 11/2010 | Peterson et al. | |
| 7,856,534 B2 | 12/2010 | Van Doren et al. | |
| 7,973,804 B2 | 7/2011 | Mejdrich et al. | |
| 7,978,205 B1 | 7/2011 | Patel et al. | |
| 8,195,859 B2 | 6/2012 | Le Moal | |
| 8,248,401 B2 | 8/2012 | Fowler et al. | |
| 8,248,412 B2 | 8/2012 | Fowler et al. | |
| 8,332,452 B2 | 12/2012 | Mejdrich et al. | |
| 8,341,611 B2 | 12/2012 | Munshi et al. | |
| 8,405,670 B2 | 3/2013 | Mejdrich et al. | |
| 2003/0037117 A1 | 2/2003 | Tabuchi | |
| 2003/0038798 A1 | 2/2003 | Besl et al. | |
| 2003/0169269 A1 | 9/2003 | Sasaki et al. | |
| 2004/0021768 A1 | 2/2004 | Payne et al. | |
| 2004/0125103 A1 | 7/2004 | Kaufman et al. | |

(Continued)

OTHER PUBLICATIONS

U.S. Appl. No. 12/784,522; Final Office Action dated Aug. 31, 2012; 19 pages.

(Continued)

*Primary Examiner* — James A Thompson
*Assistant Examiner* — Sarah Le
(74) *Attorney, Agent, or Firm* — Toler Law Group

(57) ABSTRACT

A method includes receiving packed data corresponding to pixel components to be processed at a graphics pipeline. The method includes unpacking the packed data to generate floating point numbers that correspond to the pixel components. The method also includes routing each of the floating point numbers to a separate lane of the graphics pipeline. Each of the floating point numbers are to be processed by multiplier units of the graphics pipeline.

17 Claims, 5 Drawing Sheets

(56) References Cited

U.S. PATENT DOCUMENTS

| | | | |
|---|---|---|---|
| 2006/0010449 | A1 | 1/2006 | Flower et al. |
| 2006/0066607 | A1 | 3/2006 | Schmittler et al. |
| 2006/0104545 | A1 | 5/2006 | Matsumoto |
| 2006/0149804 | A1 | 7/2006 | Luick et al. |
| 2006/0152519 | A1* | 7/2006 | Hutchins et al. ............ 345/561 |
| 2007/0018980 | A1 | 1/2007 | Berteig et al. |
| 2007/0079161 | A1 | 4/2007 | Gupta |
| 2007/0091089 | A1 | 4/2007 | Jiao et al. |
| 2008/0024489 | A1 | 1/2008 | Shearer |
| 2008/0028403 | A1 | 1/2008 | Hoover et al. |
| 2008/0049016 | A1 | 2/2008 | Shearer |
| 2008/0049017 | A1 | 2/2008 | Shearer |
| 2008/0074417 | A1 | 3/2008 | Mejdrich et al. |
| 2008/0074420 | A1 | 3/2008 | Kuesel et al. |
| 2008/0079713 | A1* | 4/2008 | Mejdrich et al. ............ 345/418 |
| 2008/0079714 | A1 | 4/2008 | Shearer |
| 2008/0079715 | A1 | 4/2008 | Shearer |
| 2008/0094410 | A1 | 4/2008 | Jiao et al. |
| 2008/0122838 | A1 | 5/2008 | Hoover et al. |
| 2008/0122853 | A1 | 5/2008 | Brown et al. |
| 2008/0158228 | A1* | 7/2008 | Fossum et al. ............... 345/426 |
| 2008/0180441 | A1 | 7/2008 | Brown et al. |
| 2008/0183791 | A1* | 7/2008 | Ho et al. ....................... 708/501 |
| 2008/0192063 | A1 | 8/2008 | Liao et al. |
| 2009/0083357 | A1* | 3/2009 | Muff et al. .................... 708/445 |
| 2009/0125574 | A1 | 5/2009 | Mejdrich et al. |
| 2009/0167763 | A1 | 7/2009 | Waechter et al. |
| 2009/0187734 | A1* | 7/2009 | Mejdrich et al. ................ 712/22 |
| 2009/0201302 | A1 | 8/2009 | Hoover et al. |
| 2009/0231349 | A1 | 9/2009 | Mejdrich et al. |
| 2009/0256836 | A1 | 10/2009 | Fowler et al. |
| 2009/0262132 | A1 | 10/2009 | Peterson et al. |
| 2009/0282222 | A1 | 11/2009 | Hoover et al. |
| 2009/0282419 | A1 | 11/2009 | Mejdrich et al. |
| 2009/0295805 | A1 | 12/2009 | Ha et al. |
| 2010/0073370 | A1 | 3/2010 | McCombe et al. |
| 2011/0018884 | A1 | 1/2011 | Ritts et al. |
| 2011/0090225 | A1 | 4/2011 | Twilleager |
| 2011/0285709 | A1 | 11/2011 | Mejdrich et al. |
| 2011/0285710 | A1 | 11/2011 | Mejdrich et al. |
| 2011/0316855 | A1 | 12/2011 | Mejdrich et al. |
| 2011/0316864 | A1 | 12/2011 | Mejdrich et al. |
| 2011/0321049 | A1 | 12/2011 | Hickey et al. |
| 2011/0321057 | A1 | 12/2011 | Mejdrich et al. |
| 2012/0209944 | A1 | 8/2012 | Mejdrich et al. |
| 2013/0044117 | A1 | 2/2013 | Mejdrich et al. |
| 2013/0046518 | A1 | 2/2013 | Mejdrich et al. |

OTHER PUBLICATIONS

U.S. Appl. No. 12/784,522; Non-Final Office Action dated Apr. 26, 2012; 17 pages.

U.S. Appl. No. 12/784,522; Non-Final Office Action dated Jan. 9, 2013; 19 pages.

U.S. Appl. No. 12/784,525; Final Office Action dated Mar. 22, 2013; 43 pages.

U.S. Appl. No. 12/784,525; Non-Final Office Action dated Oct. 12, 2012; 40 pages.

U.S. Appl. No. 12/822,427; Non-Final Office Action dated May 21, 2013; 30 pages.

U.S. Appl. No. 12/823,745; Final Office Action dated Jan. 4, 2013; 18 pages.

U.S. Appl. No. 12/823,745; Non-Final Office Acton dated Aug. 28, 2012; 15 pages.

U.S. Appl. No. 12/823,745; Notice of Allowance dated Apr. 24, 2013; 11 pages.

Benthin, C. et al., "Ray Tracing on the Cell Processor", IEEE Symposium on Interactive Ray Tracing 2006, Sep. 2006, IEEE Computer Society, Piscataway, NJ, pp. 15-23.

Boulos, S. et al., "Packet-based Whitted and Distribution Ray Tracing", GI '07 Proceedings of Graphics Interface 2007, May 2007, ACM, New York, NY, pp. 177-184.

Catalyurek, U. et al., "A repartitioning hypergraph model for dynamic load balancing", Journal of Parallel and Distributed Computing, vol. 69, Issue 8, 2009, Elsevier, Inc., pp. 711-724.

Dachille, F. et al., "GI-Cube: An Architecture for Volumetric Global Illumination and Rendering", HWWS'00, Proceedings of the ACM SIGGRAPH/EUROGRAPHICS workshop on Graphics hardware, 2000, ACM, New York, NY, pp. 119-128.

Flaherty, J. et al., "Adaptive local refinement with octree load-balancing for the parallel solution of three-dimensional conservation laws", Journal of Parallel and Distributed Computing, vol. 47, Issue 2, 1997, Elsevier, Inc., pp. 139-152.

Flaherty, J., et al., "Distributed Octree Data Structures and Local Refinement Method for the Parallel Solution of Three-Dimensional Conservation Laws", Grid Generation and Adaptive Algorithms, 1999, Springer, pp. 113-134.

Gath, J., "Derivation of the Tangent Space Matrix", Retrieved from <<http://www.blacksmith_studios.dk/projects/downloads/tangent_matrix_derivation.php>>, 2006, Blacksmith Studios, pp. 1-8.

Hook, D., "Algorithms for Accelerating Ray Tracing", PhD Dissertation, University of Melbourne, May 29, 1995, 121 pages.

Ize, T. et al., "Asynchronous BVH Construction for Ray Tracing Dynamic Scenes on Parallel Multi-Core Architectures", Proceedings of the 2007 Eurographics Symposium on Parallel Graphics and Visualization, 2007, 8 pages.

Ize, T. et al., "Asynchronous BVH Construction for Ray Tracing Dynamic Scenes", Scientific Computing and Imaging Institute, University of Utah, Nov. 13, 2006, 8 pages.

Lauterbach, C. et al., "RT-DEFORM: Interactive Ray Tracing of Dynamic Scenes using BVHs", Proceedings of the 2006 IEEE Symposium on Interactive Ray Tracing, Sep. 2006, IEEE Computer Society, Piscataway, NJ, pp. 39-45.

Levoy, M. et al., "Gaze-Directed Volume Rendering", ACM SIGGRAPH Computer Graphics, vol. 24, Issue 2, Mar. 1990, ACM, New York, NY, pp. 217-223.

Lin, T. et al., "Stochastic Ray Tracing Using SIMD Processor Arrays", The Visual Computer, vol. 7, No. 4, Jul. 1991, Springer-Verlag, pp. 187-199.

Oh, D. et al., "Utilization Bounds for N-Processor Rate Monotone Scheduling with Static Processor Assignment", Real-Time Systems, vol. 15, Issue 2, Sep. 1998, Kluwer Academic Publishers, pp. 183-192.

Ohshima, T. et al., "Gaze-Directed Adaptive Rendering for interacting with Virtual Space", VRAIS '96, Proceedings of the 1996 Virtual Reality Annual International Symposium, 1996, IEEE Computer Society, Washington, DC, pp. 103-111.

Sevre, E. et al., "Experiments in scientific computation on the Playstation 3", Visual Geosciences, vol. 13, No. 1, Jul. 2008, Springer-Verlag, pp. 125-132.

Van Heesch, F., "3D-Graphics Rendering on a Multi-Processor Architecture", Master's Thesis, The Faculty of Electrical Engineering, Eindhoven University of Technology, Mar. 2003, 78 pages.

Wald, I. et al., "A Flexible and Scalable Rendering Engine for Interactive 3D Graphics", Technical Report TR-2002-01, Computer Graphics Group, Saarland University, 2002, 12 pages.

Wald, I. et al., "Distributed interactive ray tracing of dynamic scenes", PVG '03, Proceedings of the 2003 IEEE Symposium on Parallel and Large-Data Visualization and Graphics, 2003, IEEE Computer Society, Washington, DC, pp. 77-85.

Wald, I. et al., "State of the Art in Ray Tracing Animated Scenes", STAR Proceedings of Eurographics, Sep., 2007, The Eurographics Association, Prague, Czech Republic, pp. 89-116.

Wald, I. et al., "Interactive Rendering with Coherent Ray Tracing", Computer Graphics Forum, vol. 20, No. 3, 2001, Blackwell Publishers, Malden, MA, pp. 153-164.

Woop, S. et al., "RPU: A Programmable Ray Processing Unit for Realtime Ray Tracing", ACM Transactions on Graphics—Proceedings of ACM SIGGRAPH 2005, vol. 24, Issue 3, Jul. 2005, ACM, New York, NY, pp. 434-444.

Xue, D., "Volume Visualization Using Advanced Graphics Hardware Shaders", PhD Thesis, Department of Computer Science and Engineering, The Ohio State University, 2008, 143 pages.

(56) References Cited

OTHER PUBLICATIONS

Yagel, R. et al., "Priority-driven Ray Tracing", The Journal of Visualization and Computer Animation, vol. 8, 1997, John Wiley & Sons, Ltd., pp. 17-32.

Yang, X. et al., "Ray Tracing Dynamic Scenes using fast KD-tree Base on Multi-Core Architectures", CSSE '08, Proceedings of the 2008 International Conference on Computer Science and Software Engineering—vol. 2, IEEE, 2008, IEEE Computer Society, Washington, DC, pp. 1120-1123.

Zongker, D. et al., "Environment Matting and Compositing", Siggraph '99, Proceedings of the 26th Annual Conference on Computer Graphics and Interactive Techniques, 1999, Acm Press/Addison-Wesley Publishing Co., New York, NY, pp. 205-214.

\* cited by examiner

PERFORMING VECTOR MULTIPLICATION

I. FIELD OF THE DISCLOSURE

The present disclosure relates generally to computer processing, and more specifically, performing vector multiplication.

II. BACKGROUND

In computer graphics, normal mapping (also known as bump mapping) is a technique to provide details of a surface of a three-dimensional object. In normal mapping, calculations, such as dot products, may be performed at a pixel level to provide the details of the surface of the three-dimensional object. A graphics pipeline may repeatedly perform these calculations.

III. SUMMARY OF THE DISCLOSURE

In a particular embodiment, a method includes receiving packed data corresponding to pixel components to be processed at a graphics pipeline. The method includes unpacking the packed data to generate floating point numbers that correspond to the pixel components. The method also includes routing each of the floating point numbers to a separate lane of the graphics pipeline. Each of the floating point numbers is processed by a multiplier unit of the graphics pipeline.

In another particular embodiment, a method includes receiving packed data corresponding to pixel components to be processed at a graphics pipeline. The method includes receiving a mapping instruction. The method also includes unpacking the packed data in response to receiving the mapping instruction to generate first floating point numbers that correspond to the pixel components. The method further includes routing each of the first floating point numbers to a separate lane of the graphics pipeline via a set of mux units. Each of the first floating point numbers is processed by a multiplier unit of the graphics pipeline. The method includes routing each of second floating point numbers to the separate lanes of the graphics pipeline via the set of mux units. Each of the second floating point numbers is processed by an aligner unit of the graphics pipeline.

In another particular embodiment, a system includes an unpack unit to receive packed data corresponding to pixel components and to unpack the packed data to generate floating point numbers that correspond to the pixel components. The pixel components including a red component, a green component, and a blue component. The system includes a first plurality of mux units to selectively route each of the floating point numbers to a separate lane of a graphics pipeline. The floating point numbers are processed by multiplier units of the graphics pipeline.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
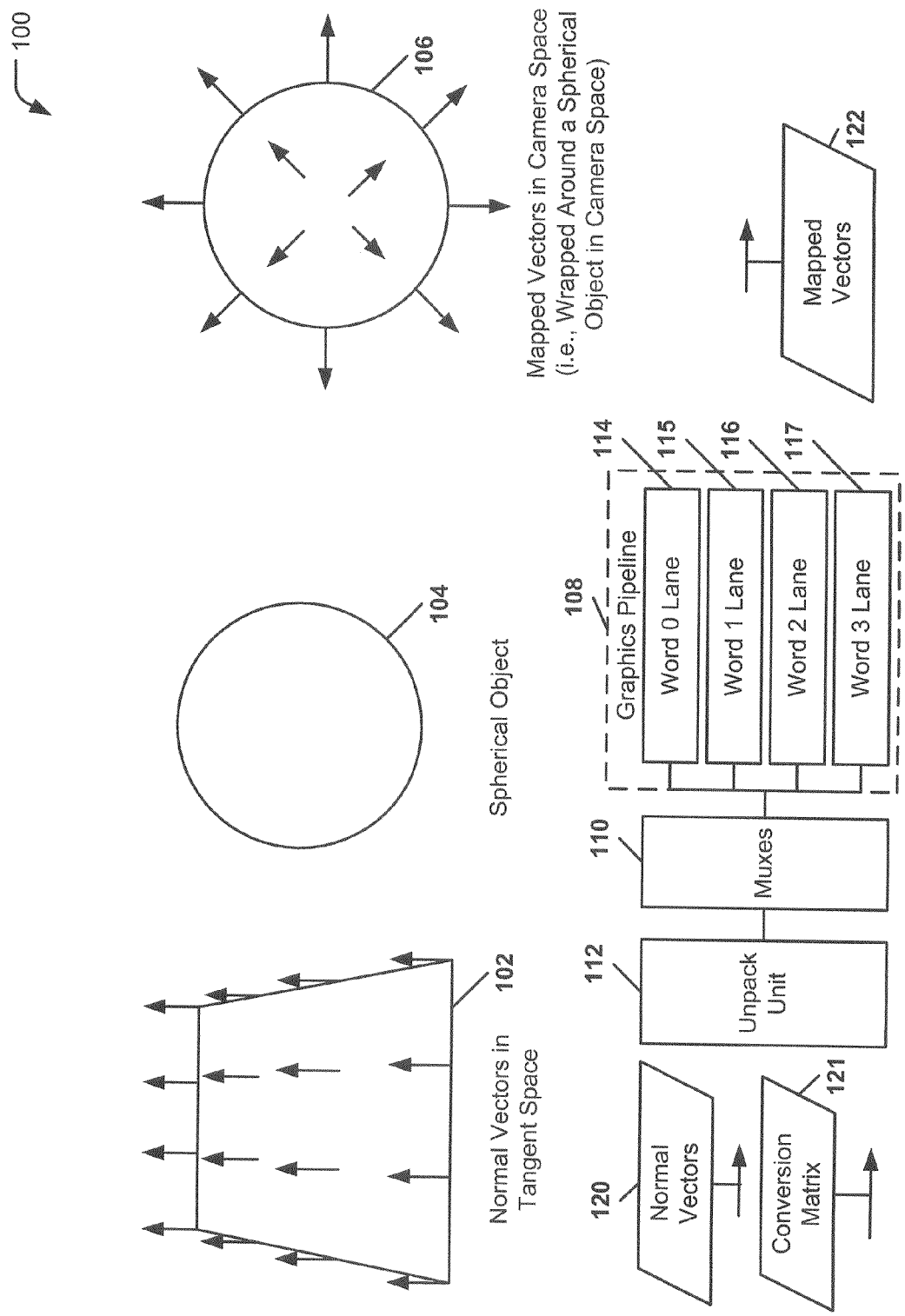
FIG. 1 is a block diagram of a system to map normal vectors from tangent space to camera space.

Normal mapping is a technique that may be used when generating three-dimensional computer graphics to generate the details of a surface of an object. Normal mapping uses data from a normal map in which red, green and blue channels of the normal map image represents x, y and z components of a normal vector at each texture pixel ("texel"). Normal mapping uses normal vectors, i.e., vectors that are perpendicular to a surface, for each pixel.

In normal mapping, the normal vectors used in per-pixel lighting calculations may be taken from the normal map. To perform the lighting calculations, it may be advantageous to have the normal vectors represented as floating point vectors. One advantage of using floating point vectors is that the lighting calculations may be performed more accurately, resulting in more realistic looking textures. Normal vectors are typically loaded into memory from the normal map as packed (i.e., compressed) colors, in which each color channel is represented by an eight-bit unsigned integers. Because a human eye can generally resolve a maximum of $2^8$ variations in a particular color, eight-bit unsigned integers may be used to represent each color channel. For example, a data representation of a twenty-four bit color pixel may include an eight-bit field representing red, an eight-bit field representing green, and an eight-bit field representing blue. The eight-bit unsigned integers may be converted to floating point values before performing the lighting calculations.

To convert the eight-bit unsigned integers to floating point numbers, each eight-bit unsigned integer may be multiplexed ("muxed") into the most significant eight-bits in a floating point pipeline. The result of multiplexing an eight-bit unsigned integer into the most significant eight-bits of a floating point number is a non-normalized number that ranges from a value of 0.0 to a value of 1.0. Because the normal vectors are typically normalized before they are stored in the normal map (i.e., each normal vector is a unit vector with a length of 1), each of the x, y and z values of each normal vector may range between a value of −1.0 to a value of +1.0. Thus, the non-normalized number that ranges from a value of 0.0 to a value of 1.0 may be scaled to normalize the intermediate result. To scale the intermediate result from the range 0.0 to 1.0 to the range −1.0 to +1.0, the intermediate result may be multiplied by two (i.e., the intermediate result would be from 0.0 to 2.0) and then the constant 1.0 may be subtracted.

Each normal vector is initially defined in a coordinate system called tangent space (also known as texture space). The coordinates and vectors in tangent space are relative to an origin on a plane of the normal map. In camera space, i.e., a coordinate system of a three-dimensional scene, vertices and mapped vectors are relative to the camera rather than to the normal map. To map a particular texture on to a surface of the three-dimensional scene, the lighting calculations may be performed using the normal vectors in the tangent space and the view, light and other vectors in the camera space. Therefore, either the view, light and other vectors in camera space may be converted to tangent space vectors, or the tangent space vectors from the normal map may be converted to camera space vectors. This disclosure describes converting normal vectors in tangent space to mapped normal vectors in camera space. Converting the normal vectors in tangent space to mapped normal vectors in camera space may involve converting (i.e., unpacking) the eight-bit unsigned integers to floating point numbers, scaling the floating point numbers, and multiplying (i.e., multiplying vectors and summing the results is known as a dot product operation) the scaled floating point numbers by a tangent space conversion matrix to create the normal vectors in camera space.

For example, the following vector multimedia extension (vmx) instructions may be used to convert normal vectors in tangent space to mapped normal vectors in camera space. In this example, vert1, vert2, and vert3 are the three vertices of a triangle (i.e., a geometric primitive) and u1, v1, u2, v2, u3, v3 are u and v coordinates for the normal map that align with the 3 vertices.

vec32.x=vert3→x−vert2→x;
vec32.y=vert3→y−vert2→y;
vec32.z=vert3→z−vert2→z;
vec12.x=vert1→x−vert2→x;
vec12.y=vert1→y−vert2→y;
vec12.z=vert1→z−vert2→z;
dv32=u3−u2; du12=u1−u2;
dv32=v3−v2; dv12=u1−v2;
Mtex=1.0/((du32*dv12)−(du12*dv32));

The tangent space conversion matrix may be a 3×3 matrix that includes vectors TanT, BinormB and NormN:

TanT.x=((dv12*vec32.x)−(dv32*vec12.x))*Mtex;
TanT.y=((dv12*vec32.y)−(dv32*vec12.y))*Mtex;
TanT.z=((dv12*vec32.z)−(dv32*vec12.z))*Mtex;
BinormB.x=((−du12*vec32.x)+(du32*vec12.x))*Mtex;
BinormB.y=((−du12*vec32.y)+(du32*vec12.y))*Mtex;
BinormB.z=((−du12*vec32.z)+(du32*vec12.z))*Mtex;
NormN=v3normalize(v3cross(TanT, BinormB));

For each of the three (i.e., red, green, blue) normal vectors that represents a pixel, the normal vector is unpacked and scaled:

tempA=(normmap_bits[(ui*3)+(vi*texmapx*3)]127.0)−1.0;
tempB=(normmap_bits[(ui*3)+(vi*texmapx*3)+1]/127.0)−1.0;
tempC=(normmap_bits[(ui*3)+(vi*texmapx*3)+2]/127.0)−1.0;

The scaled normal vectors may be multiplied by each row of the tangent space conversion matrix:

normvec.x=TanT.x*tempa+BinormB.x*tempb+NormN.x*tempc;
normvec.y=TanT.y*tempa+BinormB.y*tempb+NormN.y*tempc;
normvec.z=TanT.z*tempa+BinormB.z*tempb+NormN.z*tempc;

The 3×3 matrix made up of the vectors TangentT, BinormB, and NormN is transposed to create the tangent space conversion matrix, which is made up of the vectors TBNx, TBNy, TBNz.

[TBNx, TBNy, TBNz]=transpose[TanT, BinormB, NormN];

A dot product operation is performed using each of the rows of the tangent space conversion matrix Normal.x=dot3(TBNx, NormalFromMap)
Normal.y=dot3(TBNy, NormalFromMap)
Normal.z=dot3(TBNz, NormalFromMap)

Thus, the normal vector unpack, scaling, and tangent space conversion may be performed on a per-pixel basis. Each step of unpack, scale, and dot product, represents a dependent instruction chain that may introduce pipeline delay due to read-after-write dependency conditions. For example, when an unpack operation uses 4 cycles, a scaling operation (i.e., a multiple and an add) uses 4 cycles, and a dot product uses 6 cycles, the number of processing cycles to convert a normal vector from tangent space to camera space may utilize 14 cycles.

By merging the unsigned integer to vector floating point unpack operation and scale operation with a dot product operation, a component of a normal vector may be converted from tangent space to camera space in one pass through the graphics pipeline. By doing so, the number of processing cycles used to perform the conversion may be significantly reduced. For example, the total number of processing cycles to convert a component of a normal vector from tangent space to camera space may be reduced from 14 cycles to 6 cycles.

Referring now to FIG. 1, a block diagram of a system to map normal vectors from tangent space to camera space is depicted and generally designated 100. The system 100 includes a graphics pipeline 108, multiplexers ("mux units") 110, and an unpack unit 112. The system 100 may be used to map normal vectors from tangent space 102 to mapped vectors in camera space 106.

The graphics pipeline 108 may include multiple processing lanes, such as the first lane 114, the second lane 115, the third lane 116, and the fourth lane 117. Each of the lanes 114-117 may include multiple processing units (not shown). For example, the processing units in each of the lanes 114-117 may include an adder unit (i.e., to add floating point numbers), a multiplier unit (i.e. to multiply floating point numbers), an aligner unit (i.e., to align floating point numbers), a normalize unit (i.e., to normalize floating point numbers), a rounding unit (i.e., to round off floating point numbers), a compressor unit (i.e., to add more than two numbers), a dot product unit (i.e., to calculate a dot product of two vectors or a vector and a row of a matrix), another unit capable of performing a mathematical operation, or any combination thereof. Each of the lanes 114-117 may operate substantially in parallel.

The unpack unit 112 may unpack unsigned integers and convert the unsigned integers to floating point numbers for processing by the graphics pipeline 108. The mux units 110 may include multiplexer units to select operands to send to processing units of the lanes 114-117.

The normal vectors in tangent space 102 depict normal vectors that are perpendicular to a plane. To provide a textured surface to a spherical object 104, the normal vectors in tangent space 102 may be wrapped around the spherical object 104 to create the mapped vectors in camera space 106.

In operation, the unpack unit 112 may receive normal vectors 120 (i.e., values that represent the normal vectors in tangent space 102) and a conversion matrix 121. The unpack unit 112 may unpack the normal vectors 120 and convert the components of the normal vectors 120 to floating point numbers (not shown). The mux units 110 may select portions of the floating point numbers and send the portions to processing units in the lanes 114-117. The graphics pipeline 108 may output the transformed vectors 122 (i.e., values that represent the mapped vectors in camera space 106).

Thus, by adding the unpack unit 112 and the mux units 110 before the graphics pipeline 108, the normal vectors 120 may be rapidly converted into the transformed vectors 123. For example, the unpack unit 112 and the mux units 110 may enable the graphics pipeline 108 to perform the conversion of the normal vectors 120 more than fifty percent faster than if the unpack unit 112 and the mux units 110 were not used.

Figure 2:
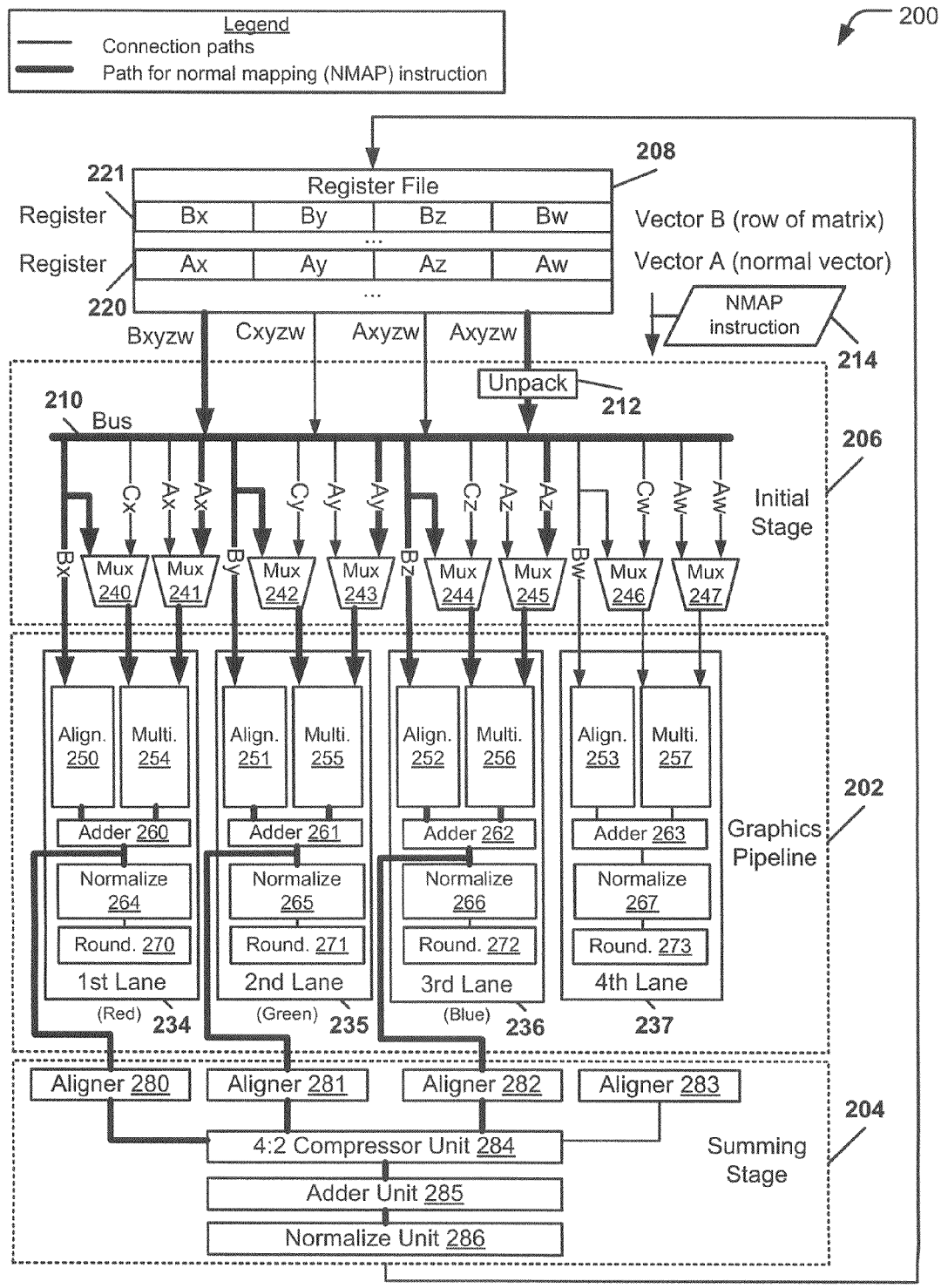
FIG. 2 is a block diagram of a system to calculate a scaled dot product.

Referring now to FIG. 2, a block diagram of a system to calculate a scaled dot product is depicted and generally designated 200. The system 200 includes a graphics pipeline 202, a summing stage 204, an initial stage 206, and a register file 208. The system 200 may be part of a graphics processing unit.

The register file 208 may include two or more registers, such as registers 220 and 221. The registers 220-221 may be used to store numbers, such as operands, results from performing operations on the numbers, memory addresses (e.g., pointers), etc. For example, each of the registers 220-221 may store words of an array that represents a vector or a row of a matrix. To illustrate, the register 220 may be used to store numbers that represent a vector A (e.g., a normal vector) and the register 221 may be used to store a row of a matrix (e.g., a vector B). Each word may be a fixed sized group of bits that are handled together by the system 200. Each word of the registers 220-221 may have a word size, such as 16, 32 or 64 bits.

The initial stage 206 includes an unpack unit 212, a bus 210, and multiplexer units (referred to as "mux units"), such as the mux units 240, 241, 242, 243, 244, 245, 246, and 247. The unpack unit 212 may unpack packed data (e.g., the content of register 220) that represents a pixel into floating point numbers. For example, the register 220 may include three eight-bit words, Ax, Ay, and Az, that represent a red, a green, and a blue value of a pixel. The unpack unit 212 may unpack each eight-bit word to generate a floating point number for processing by the graphics pipeline 202. The bus 210 may include paths (not shown) between the register file 208, the initial stage 206, the graphics pipeline 202, and the summing stage 204. For example, the paths may enable the bus 210 to route contents of the registers 220-221 to portions of the initial stage 206. The mux units 240-247 may be used to select operands from the contents of the register file 208 for the next stage, i.e., the graphics pipeline 202. For example, the mux units 240-247 may be used to select operands of the contents of the registers 220-221 for use by arithmetic units of the graphics pipeline 202.

The graphics pipeline 202 may include various arithmetic units, such as multiplier units 254, 255, 256, and 257 (e.g., to multiple two operands), aligner units 250, 251, 252, and 253 (e.g., to align floating point numbers prior to an add operation), add units 260, 261, 262, and 263 (e.g., to add two numbers together), normalize units 264, 265, 266, and 267 (e.g., to scale a number by changing a range of the number), rounding units 270, 271, 272, and 273 (e.g., to round off numbers), or any combination thereof. The graphics pipeline 202 may be structured into lanes that operate substantially in parallel on each word of the contents of the registers 220-221. For example, the graphics pipeline 202 may include a first lane 234, a second lane 235, a third lane 236, and a fourth lane 237. The first lane 234 may operate on a first word of the contents of the registers 220-221 as selected by the initial stage 206. The second lane 235 may operate on a second word of the contents of the registers 220-221 as selected by the initial stage 206. The third lane 236 may operate on a third word of the contents of the registers 220-221 as selected by the initial stage 206. The fourth lane 237 may operate on a fourth word of the contents of the registers 220-221 as selected by the initial stage 206. For example, the first lane 234 may compute a red ("R") component of a pixel, the second lane 235 may compute a green ("G") component of the pixel, and the third lane 236 may compute a blue ("B") component of the pixel. In the context of a computer graphics system that is computing three colors for each pixel (i.e., RGB), the fourth lane may not be used.

The summing stage 204 may be used to perform a dot product operation (e.g., a vector multiply and a vector add) on an output of the graphics pipeline 202. The summing stage 204 may include various arithmetic units, such as aligners 280-283 (e.g., to align floating numbers for an add/compress operation), a 4:2 compressor unit 284 (e.g., to add two pairs of numbers to produce a pair of intermediate results), an adder unit 285 (e.g., to add the pair of intermediate results to produce a final number), and a normalize unit 286 (e.g., to normalize the final number). An output of the summing stage 204 may be stored in a result register (not shown) of the register file 208.

In operation, words representing a vector A (e.g., a normal vector) may be stored in the register 220. For example, words Ax, Ay, Az, and Aw may be stored in the register 220. The words Ax, Ay, and Az may represent a directional component of the vector in a three-dimensional space or the red, green and blue components of a pixel. The word Aw may represent a velocity component of the vector.

Words representing a vector B may be stored in the register 221. For example, floating point words Bx, By, Bz, and Bw may be stored in the register 221. To illustrate, the words Bx, By, Bz, and Bw may be a row of a tangent space conversion matrix. The vector A and the vector B may be stored at the registers 220-221 by a computer graphics system (not shown) to enable the system 200 to transform the vector A from a normal vector in tangent space to a normal vector in camera space.

The unpack unit 212 may determine that a normal mapping ("nmap") instruction 214 is to be executed on the contents of registers 220-221 (i.e., vector A and vector B). In response, the unpack unit 212 may convert each word of the content of register 220 into a floating point number. For example, the unpack unit 212 may set an implicit bit and an unbiased exponent to zero and multiplex in a word of the vector A into a most significant fraction bits. To illustrate, the unpack unit 212 may convert a hexadecimal word 0b00110011 to a floating point equivalent, i.e., $0.00110011 \times 2^0$.

To map a normal vector from tangent space to camera space, a scaled dot product may be calculated. A dot product is calculated as dot3=(Ax*Bx)+(Ay*By)+(Az*Bz). The result of the dot product may be in the range from 0 to 1. To scale the result of the dot product in the range from −1 and 1, the result may be multiplied by 2 and then 1 may be subtracted: ((2Ax−1)*Bx)+((2Ay−1)*By)+((2Az−1)*Bz), where Axyz is the unpacked vector A and B is the tangent space conversion matrix. Mathematically, the scaled result is equal to (2Ax Bx−Bx)+(2AyBy−By)+(2AzBz−Bz). The initial stage 206 may select the appropriate operands of the contents of registers 220-221 to enable the graphics pipeline 202 to calculate and output the scaled result.

For example, in the first lane 234, the multiplier unit 254 may receive the words Ax and Bx from the mux units 240-241, compute 2A×Bx, and provide the result to the adder 260. To illustrate, the multiplier unit 254 may compute A×Bx and then increment the exponent of the resulting floating point number to compute 2A×Bx. The aligner unit 250 may align the word Bx for a subtraction operation and provide the result to the adder unit 260. The aligner unit 250 may align the word Bx substantially at the same time (i.e., in parallel) that the multiplier unit 254 computes 2A×Bx. The adder unit 260 may receive 2A×Bx from the multiplier unit 254, receive Bx from the aligner unit 250, and compute 2A×Bx−Bx.

In the second lane 235, the multiplier unit 255 may receive the words Ay and By from the mux units 242-243, compute 2AyBy, and provide the result to the adder 261. The aligner unit 251 may align the word By for a subtraction operation and provide the result to the adder unit 261. The aligner unit 251 may align the word By substantially at the same time (i.e., in parallel) that the multiplier unit 255 computes 2AyBy. The adder unit 261 may receive 2AyBy from the multiplier unit 255, receive By from the aligner unit 251, and subtract By from 2AyBy (i.e., compute 2AyBy−By).

In the third lane 236, the multiplier unit 256 may receive the words Az and Bz from the mux units 244-245, compute 2AzBz, and provide the result to the adder 262. The aligner unit 252 may align the word Bz for a subtraction operation and provide the result to the adder unit 262. The aligner unit 252 may align the word Bz substantially at the same time (i.e., in parallel) that the multiplier unit 256 computes 2AzBz. The adder unit 262 may receive 2AzBz from the multiplier unit 256, receive Bz from the aligner unit 252, and compute 2AzBz−Bz.

To compute the scaled dot product, the results from each of the lanes 234-236 may be summed. The output of the adder units 260-262 may be sent to summing stage 204, bypassing the normalize units 264-267 and the rounding units 270-273. The aligner units 280-282 may receive the results of calculating 2AxBx−Bx, 2AyBy−By, and 2AzBz−Bz from the adder units 260-262, respectively. The aligner units 280-282 may align the results of calculating 2AxBx−Bx, 2AyBy−By, and 2AzBz−Bz to enable the 4:2 compressor unit 284 to add two pairs of numbers to produce a pair of numbers. Because the fourth lane 237 is not used, the 4:2 compressor unit 284 may determine the result of (2AxBx−Bx+2AyBy−By) and (2AzBz−Bz+0). The adder unit 285 may take the results of the 4:2 compressor unit 284 and add the two numbers together to produce the scaled dot product result of 2AxBx−Bx+2AyBy−By+2AzBz−Bz.

The normalize unit 286 may normalize the result of the adder unit 285 and store the result in the register file 208. For example, the normalize unit 286 may convert the result of the adder unit 285 from a floating point number to an integer equivalent and store the integer equivalent in a result register (not shown) of the register file 208.

The result of the normalize unit 286 is the dot product of vector A with vector B (i.e., a row of a transformation matrix). The dot product of vector A and vector B is a first entry of the vector A mapped to camera space from tangent space. To calculate the transformation of the vector A from tangent space to camera space, the dot product of each row of the transformation matrix with the vector A may be calculated. Thus, to transform the vector A from tangent space to camera space, the vector A may be loaded into the register 220, the first row of the transformation matrix may be loaded into the register 221, the dot product of vector A with the first row of the transformation matrix may be computed (e.g., using the initial stage 206, the graphics pipeline 202, and the summing stage 204), and the process repeated for each of the other two rows of the transformation matrix.

$$|B_{11}B_{12}B_{13}||A_x| \quad |A_xB_{11} + A_yB_{12} + A_zB_{13}|$$
$$|B_{21}B_{22}B_{23}||A_y| = |A_xB_{21} + A_yB_{22} + A_zB_{23}|$$
$$|B_{31}B_{32}B_{33}||A_z| \quad |A_xB_{31} + A_yB_{32} + A_ZB_{33}|$$

In the above example, in the first pass through the initial stage 206, the graphics pipeline 202, and the summing stage 204, $B_{11}, B_{12}, B_{13}$ may correspond to Bx, By, and Bz, respectively, that are stored in the register 221. In the second pass through, $B_{21}, B_{22}, B_{23}$ may correspond to Bx, By, and Bz, that are stored in the register 221. In the third pass, $B_{31}, B_{32}, B_{23}$ may correspond to Bx, By, and Bz, that are stored in the register 221.

Thus, by adding the unpack unit 212 and the mux units 240-247 before the graphics pipeline 202, each word of the vector A (i.e., Ax, Ay, and Az) may be unpacked as floating point numbers and selected as operands to perform a dot product operation and a scaling operation. The dot product operation and scaling operation may be performed without having to write any intermediate results to the register file 208, thereby reducing the number of clock (or processor) cycles used to calculate the scaled result of the dot product operation.

Figure 3:
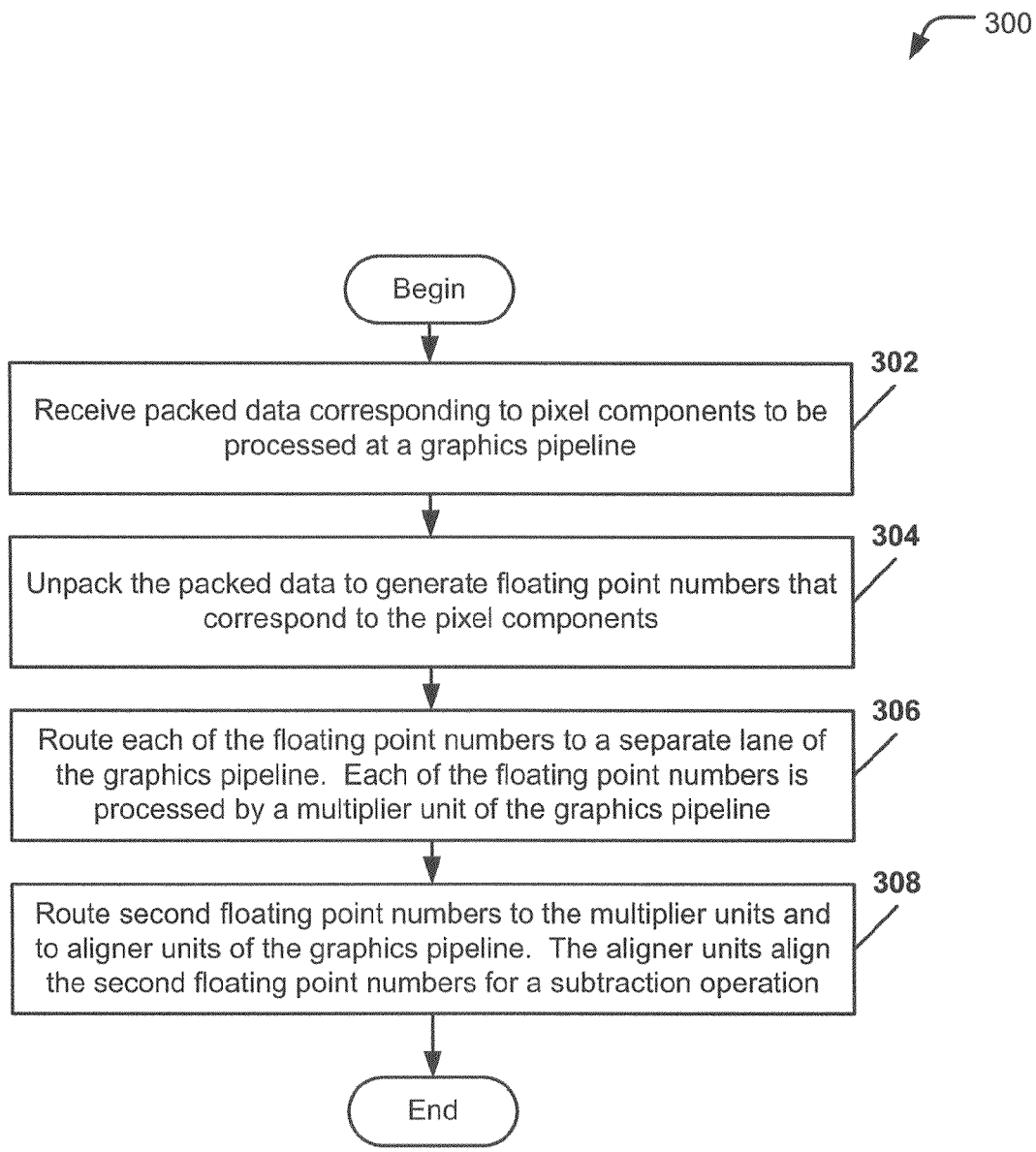
FIG. 3 is a first flow diagram of a method to calculate a scaled dot product.

Referring now to FIG. 3, a first flow diagram of a method to calculate a scaled dot product is depicted and generally designated 300. The method 300 may be performed by an initial stage, such as the unpack unit 112 and the mux units 110 of FIG. 1 or the initial stage 206 of FIG. 2.

The method 300 begins when packed data corresponding to pixel components to be processed at a graphics pipeline is received, at 302. Moving to 304, the packed data is unpacked to generate floating point numbers that correspond to the pixel components. For example, in FIG. 2, the unpack unit 212 may unpack the words Ax, Ay, and Az stored in the register 220 to generate floating point numbers that correspond to Ax, Ay, and Az.

Moving to 306, each of the floating point numbers is routed to a separate lane of the graphics pipeline. Each of the floating point numbers is processed by a multiplier unit of the graphics pipeline. Advancing to 308, second floating point numbers may be routed to aligner units of the graphics pipeline and the method 300 ends. The aligner units may align the second floating point numbers for a subtraction operation. For example, in FIG. 2, the mux units 240-247 may route the floating point numbers generated by the unpack unit 212 to the multipliers 254-257 of the graphics pipeline 202. The mux units 240-247 may route the second floating numbers (e.g., Bx, By, Bz, and Bw) that are stored in register 221 to the multiplier units 254-257 and to the aligner units 250-253.

Thus, an unpack unit may be used to unpack packed data that represents a pixel to generate floating point numbers. Mux units may route the floating point numbers and second floating point numbers (e.g., entries in a row of a conversion matrix) to a graphics pipeline. Multiplier units of the graphics pipeline may multiply the floating point numbers with the second floating point numbers. Adder units of the graphics pipeline may subtract the second floating point numbers from the result of multiplying the floating point numbers with the second floating point numbers to produce scaled floating point numbers. The scaled floating point numbers may be summed to produce a scaled dot product of the floating point numbers with the second floating point numbers. For example, the floating point numbers may represent a normal vector in tangent space, the second floating point numbers may represent a row of a tangent space conversion matrix, and the scaled dot product may represent an entry of the mapped vector in camera space.

Figure 4:
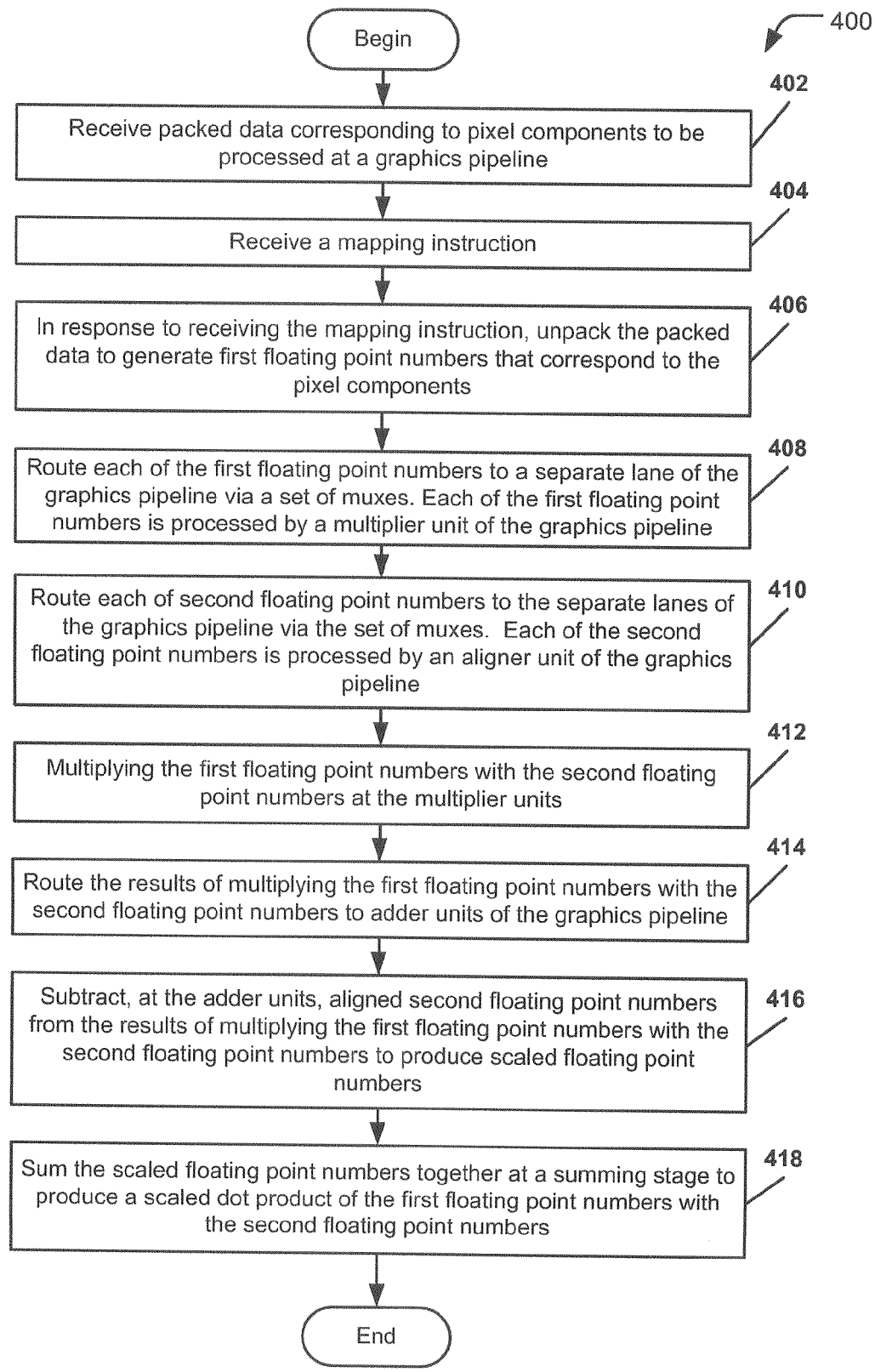
FIG. 4 is a second flow diagram of a method to calculate a scaled dot product.

Referring now to FIG. 4, a second flow diagram of a method to calculate a scaled dot product is depicted and generally designated 400. The method 400 may be performed by the system 100 of FIG. 1 or by the system 200 of FIG. 2.

The method 400 begins when packed data corresponding to pixel components to be processed at a graphics pipeline are received, at 402. Moving to 404, a mapping instruction is received. Advancing to 406, in response to receiving the mapping instruction, the packed data is unpacked to generate first floating point numbers that correspond to the pixel components. For example, in FIG. 2, in response to receiving the NMAP instruction 214, the unpack unit 212 may unpack the contents of register 220 to generate first floating point numbers that correspond to red, green, and blue pixel components.

Proceeding to 408, each of the first floating point numbers are routed to a separate lane of the graphics pipeline via a set of muxes. Each of the first floating point numbers is processed by a multiplier unit of the graphics pipeline. Continuing to 410, each of second floating point numbers may be routed to the separate lanes of the graphics pipeline via the set of muxes. Each of the second floating point numbers is processed by an aligner unit of the graphics pipeline. For example, in FIG. 2 the mux units 240-247 may send first floating point numbers (i.e., the unpacked contents of the register 220) to the multiplier units 254-257. The mux units 240-247 may send second floating point numbers (i.e., the contents of the register 221) to the multiplier units 254-257 and to the aligners 250-253.

Moving to 412, the first floating point numbers may be multiplied with the second floating point numbers at the multiplier units. For example, in FIG. 2, the multiplier unit 254 may multiply 2Ax with Bx, the multiplier unit 255 may multiply 2Ay with By, and the multiplier unit 254 may multiply 2Az with Bz. Advancing to 414, the results of multiplying the first floating point numbers with the second floating point numbers may be routed to adder units of the graphics pipeline. Continuing to 416, the adder units may subtract aligned second floating point numbers from the results of multiplying the first floating point numbers with the second floating point numbers to produce scaled floating point numbers. For example, in FIG. 2, the adder unit 260 may subtract Bx from 2A×Bx (i.e., the result from the multiplier unit 254), the adder unit 261 may subtract By from 2AyBy (i.e., the result from the multiplier unit 255), and the adder unit 262 may subtract Bz from 2AzBz (i.e., the result from the multiplier unit 256).

Moving to 418, the scaled floating point numbers may be summed together at a summing stage to produce a scaled dot product of the first floating point numbers with the second floating point numbers and the method 400 ends. For example, in FIG. 2, the summing stage 204 may sum (2AxBx−Bx), (2AyBy−By), and (2AzBz−Bz) to produce a scaled dot product of the unpacked vector A with the vector B.

Thus, an unpack unit may be used to unpack packed data that represents a pixel to generate floating point numbers. Mux units may route the floating point numbers and second floating point numbers (e.g., entries in a row of a conversion matrix) to a graphics pipeline. Multiplier units of the graphics pipeline may multiply the floating point numbers with the second floating point numbers. Adder units of the graphics pipeline may subtract the second floating point numbers from the result of multiplying the floating point numbers with the second floating point numbers to produce scaled floating point numbers. The scaled floating point numbers may be summed to produce a scaled dot product of the floating point numbers with the second floating point numbers. For example, the floating point numbers may represent a normal vector in tangent space, the second floating point numbers may represent a row of a tangent space conversion matrix, and the scaled dot product may represent a component of the normal vector transformed into camera space.

Figure 5:
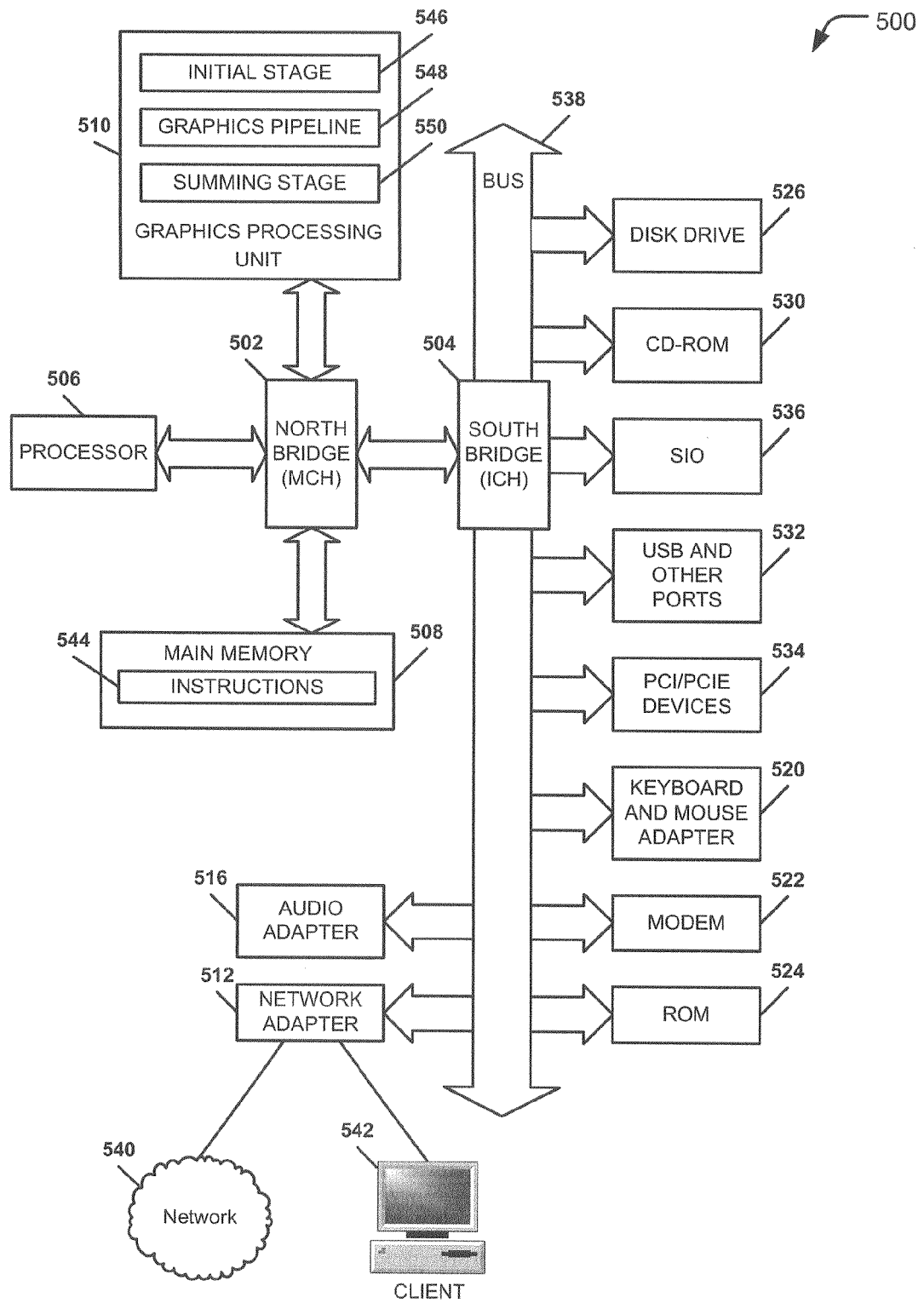
FIG. 5 is a general diagram of a computing system.

FIG. 5 is a block diagram of a computing system in which systems and methods of the present disclosure may be implemented. Computing system 500 includes an a graphics processing unit 510 that may be used to perform a scaled dot product operation.

In the depicted example, the computing system 500 employs a hub architecture including a north bridge and a memory controller hub (MCH) 502 and a south bridge and input/output (I/O) controller hub (ICH) 504. A processor 506, a main memory 508, and the graphics processing unit 510 are coupled to the north bridge and memory controller hub 502. For example, the graphics processing unit 510 may be coupled to the MCH 502 through an accelerated graphics port (AGP) (not shown).

The graphics processing unit 510 may include an initial stage 546, a graphics pipeline 548, and a summing stage 550. For example, the initial stage 546 may include an unpack unit (now shown) and mux units (not shown), similar to the initial stage 206 of FIG. 2. The graphics pipeline 548 may include aligner units (not shown), multiplier units (not shown), and adder units (not shown), similar to the graphics pipeline 202 of FIG. 2. The summing stage 550 may include aligner units, compressor units, adder units, and normalize units, similar to the summing stage 204 of FIG. 2.

In the depicted example, a network adapter 512 is coupled to the south bridge and I/O controller hub 504 and an audio adapter 516, a keyboard and mouse adapter 520, a modem 522, a read only memory (ROM) 524, universal serial bus (USB) ports and other communications ports 532, and Peripheral Component Interconnect (PCI) and Peripheral Component Interconnect Express (PCIe) devices 534 are coupled to the south bridge and I/O controller hub 504 via bus 538. A disk drive 526 and a CD-ROM drive 530 are coupled to the south bridge and I/O controller hub 504 through the bus 538. The PCI/PCIe devices 534 may include, for example, Ethernet adapters, add-in cards, and PC cards for notebook computers. The ROM 524 may be, for example, a flash binary input/output system (BIOS). The disk drive 526 and the CD-ROM drive 530 may use, for example, an integrated drive electronics (IDE) or serial advanced technology attachment (SATA) interface. A super I/O (SIO) device 536 may be coupled to the south bridge and I/O controller hub 504.

The main memory 508 includes computer instructions 544 on a computer readable medium. The computer instructions 544 are executable by the processor 506 or the graphic processing unit 510 to perform various functions.

An operating system (not shown) runs on the processor 506 and coordinates and provides control of various components within the computing system 500. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 500 (Java and all Java-based trademarks are trademarks of Sun Microsystems, Inc. in the United States, other countries, or both).

Instructions for the operating system, the object-oriented programming system, and applications or programs are located on storage devices, such as the disk drive 526, and may be loaded into the main memory 508 for execution by the processor 506. The processes of the disclosed illustrative embodiments may be performed by the processor 506 using computer implemented instructions, which may be located in a non-transitory memory such as, for example, the main memory 508, the read only memory 524, or in one or more of the peripheral devices.

The hardware in computing system 500 may vary depending on the implementation. Other internal hardware or peripheral devices, such as flash memory, equivalent non-volatile memory, or optical disk drives and the like, may be used in addition to or in place of the hardware depicted in FIG. 5.

Also, the processes of the disclosed illustrative embodiments may be applied to a multiprocessor data processing system.

In some illustrative examples, portions of the computing system 500 may be implemented in a personal digital assistant (PDA), which is generally configured with flash memory to provide non-volatile memory for storing operating system files and/or user-generated data. A bus system may include one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 508 or a cache such as found in the north bridge and memory controller hub 502. A processing unit may include one or more processors or CPUs, such as the processor 506 or the graphics processing unit 510. The depicted examples in FIG. 5 and above-described examples are not meant to imply architectural limitations. For example, portions of the computing system 500 also may be implemented in a personal computer, server, server cluster, tablet computer, laptop computer, or telephone device in addition to taking the form of a PDA.

Particular embodiments of the computing system 500 can take the form of an entirely hardware embodiment or an embodiment containing both hardware and software units. In a particular embodiment, the disclosed methods are implemented in software that is embedded in processor readable non-transitory medium and executed by a processor, which includes but is not limited to firmware, resident software, microcode, etc.

Further, embodiments of the present disclosure, such as the one or more embodiments in FIGS. 1-5 can take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory units through a system bus. The memory units can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method, comprising:
receiving packed data corresponding to pixel components to be processed at a graphics pipeline;
unpacking the packed data to generate a first floating point number that corresponds to a first pixel component;
routing the first floating point number to a corresponding first lane of the graphics pipeline, the first floating point number to be processed by a multiplier unit of the first lane;
routing a second floating point number in parallel to the multiplier unit of the first lane and to an aligner unit of the first lane, the aligner unit of the first lane to align the second floating point number for a subtraction operation;
multiplying the first floating point number with the second floating point number at the multiplier unit of the first lane to obtain a first multiplication result; and
routing the first multiplication result and the aligned second floating point number to an adder unit of the first lane.

2. The method of claim 1, wherein the unpacking and the routing the first floating point number to the first lane are performed in response to receiving a mapping instruction.

3. The method of claim 1, wherein the adder unit of the first lane is operable to subtract the aligned second floating point number from the first result to produce a first scaled floating point number.

4. The method of claim 3, further comprising:
unpacking the packed data to generate a third floating point number that corresponds to a second pixel component;
routing the third floating point number to a corresponding second lane of the graphics pipeline, the third floating point number to be processed by a multiplier unit of the second lane;
routing a fourth floating point number in parallel to the multiplier unit of the second lane and to an aligner unit of the second lane, the aligner unit to align the fourth floating point number for a second subtraction operation;
multiplying the third floating point number with the fourth floating point number to obtain a second multiplication result; and
routing the second multiplication result and the aligned second floating point number to an adder unit of the second lane, wherein the adder unit of the second lane is operable to subtract the aligned fourth floating point number from the second result to produce a second scaled floating point number.

5. The method of claim 4, wherein the first scaled floating point number and the second floating point number are summed together to produce a scaled dot product.

6. The method of claim 5, wherein the scaled dot product is produced without writing intermediate results from the multiplier unit of the first lane, the multiplier unit of the second lane, the aligner unit of the first lane, the aligner unit of the second lane, the adder unit of the first lane, or the adder unit of the second lane to a register file.

7. The method of claim 1, wherein routing the first floating point number to the first lane is performed by a first mux unit of a plurality of mux units.

8. The method of claim 1, wherein the multiplier unit of the first lane increments an exponent of the first multiplication result.

9. A method, comprising:
receiving packed data corresponding to pixel components to be processed at a graphics pipeline;
receiving a mapping instruction;
in response to receiving the mapping instruction, unpacking the packed data to generate a first floating point number that corresponds to a pixel component;
routing the first floating point number to a corresponding first lane of the graphics pipeline via a set of mux units, the first floating point number to be processed by a multiplier unit of the first lane;
routing a second floating point number to the first lane of the graphics pipeline via the set of mux units, the second floating point number to be processed by an aligner unit of the first lane and the multiplier unit of the first lane, wherein the aligner unit of the first lane aligns the second floating point number to produce an aligned second floating point number; and
multiplying the first floating point number with the second floating point number at the multiplier unit of the first lane to obtain a first multiplication result;
incrementing an exponent of the first result at the multiplier unit of the first lane;
routing the first multiplication result to an adder unit of the first lane; and
routing the aligned second floating point number to the adder unit of the first lane.

10. The method of claim 9, further comprising:
subtracting, at the adder unit of the first lane, the aligned second floating point number from the first multiplication result to produce a first scaled floating point number.

11. The method of claim 10, further comprising summing the first scaled floating point number, a second scaled floating point number produced by a second lane of the graphics pipeline, and a third scaled floating point number produced by a third lane of the graphics pipeline together at a summing stage to produce a scaled dot product.

12. The method of claim 11, wherein the scaled dot product is produced in no more than fourteen clock cycles.

13. A system, comprising:
an unpack unit to receive packed data corresponding to pixel components and to unpack the packed data to generate a first floating point number, a second floating point number, and a third floating point number that each correspond to the pixel components, the pixel components including a red component, a green component, and a blue component;
a first plurality of mux units to selectively route the first floating point number to a corresponding first lane of a graphics pipeline, the first floating point number to be processed by a multiplier unit of the first lane; and
a second plurality of mux units to selectively route a fourth floating point number to
an aligner unit of the first lane, wherein the aligner unit aligns the fourth floating point number to produce an aligned fourth floating point number and routes the aligned fourth floating point number to an adder unit of the first lane; and
the multiplier unit of the first lane, wherein the multiplier unit of the first lane multiplies the first floating point number with the fourth floating point number to produce a first multiplication result and increments an exponent of the first multiplication result, and wherein the first multiplication result is routed to the adder unit of the first lane for a subtraction operation with the aligned fourth floating point number.

14. The system of claim 13, wherein the unpack unit is operable to unpack the packed data in response to receiving a mapping instruction.

15. The system of claim 13, wherein the adder unit of the first lane is operable to subtract the aligned fourth floating point number from the first multiplication result to produce a first scaled floating point number.

16. The system of claim 15, further comprising a summing stage to sum the first scaled floating point number, a second scaled floating point number produced by a second lane of the graphics pipeline, and a third scaled floating number produced by a third lane of the graphics pipeline to produce a scaled dot product.

17. The system of claim 13, wherein the first floating point number represents a component of a vector in tangent space and, wherein the fourth floating point number represents a corresponding element of a transfoiuiation matrix configured to map the vector from tangent space to camera space.

* * * * *